US010328543B2

(12) United States Patent
Morimura

(10) Patent No.: US 10,328,543 B2
(45) Date of Patent: Jun. 25, 2019

(54) MACHINE TOOL

(71) Applicant: OKUMA Corporation, Niwa-gun, Aichi (JP)

(72) Inventor: Shoichi Morimura, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 0 days.

(21) Appl. No.: 15/678,677

(22) Filed: Aug. 16, 2017

(65) Prior Publication Data

US 2018/0050432 A1 Feb. 22, 2018

(30) Foreign Application Priority Data

Aug. 17, 2016 (JP) .................................. 2016-160110

(51) Int. Cl.
*B23Q 1/76* (2006.01)
*B23B 13/12* (2006.01)
*B23Q 17/00* (2006.01)
*B23Q 17/09* (2006.01)

(52) U.S. Cl.
CPC .......... *B23Q 17/005* (2013.01); *B23B 13/126* (2013.01); *B23Q 1/766* (2013.01); *B23Q 17/0966* (2013.01); *B23B 2260/128* (2013.01)

(58) Field of Classification Search
CPC .......... B23B 29/16; B23Q 1/76; B23Q 17/22; Y10T 82/2593; Y10T 82/2595
See application file for complete search history.

(56) References Cited

U.S. PATENT DOCUMENTS

| 4,396,049 A * | 8/1983 | Calvert ................... B27L 5/025 144/209.1 |
| 4,463,635 A * | 8/1984 | Hafla ....................... B23Q 1/76 294/116 |
| 4,754,673 A * | 7/1988 | Hiestand .................. B23Q 1/76 82/162 |
| 4,878,705 A * | 11/1989 | Arnquist ................ B25J 15/103 294/116 |
| 5,168,609 A * | 12/1992 | Kojima ..................... B23B 3/06 29/27 R |
| 5,201,501 A * | 4/1993 | Fassler ..................... B23Q 1/76 269/156 |
| 5,254,068 A * | 10/1993 | Yamada ........... G05B 19/40937 29/27 R |
| 2004/0060403 A1 * | 4/2004 | Pace ........................ B23B 29/16 82/162 |

(Continued)

FOREIGN PATENT DOCUMENTS

JP     2010264562 A    11/2010

*Primary Examiner* — Willmon Fridie, Jr.
(74) *Attorney, Agent, or Firm* — Cantor Colburn LLP

(57) ABSTRACT

A machine tool which removal-machines a workpiece by means of a tool includes a retaining device (a workpiece spindle and a tailstock) that retains the workpiece, a support device (an in-machine robot) that supports the workpiece, in order to suppress deflection of the workpiece retained by the retaining device, and a control device that controls driving of the support device by force control having a force as a control target. Specifically, a supporting force by the support device and a machining force by a tool are measured, and the driving of the support device is controlled so that the supporting force is equal to the machining force.

13 Claims, 7 Drawing Sheets

(56) References Cited

U.S. PATENT DOCUMENTS

| | | | |
|---|---|---|---|
| 2008/0289463 A1* | 11/2008 | Rehm | B23Q 1/76 82/164 |
| 2010/0028117 A1* | 2/2010 | Nihei | B25J 9/0009 414/728 |
| 2010/0061830 A1* | 3/2010 | Kitayama | B23Q 7/04 414/222.05 |
| 2010/0288088 A1* | 11/2010 | Miyamoto | B23Q 1/76 82/1.11 |
| 2018/0059637 A1* | 3/2018 | Shimodaira | G05B 19/401 |
| 2018/0093380 A1* | 4/2018 | Yoshida | B25J 9/1697 |

* cited by examiner

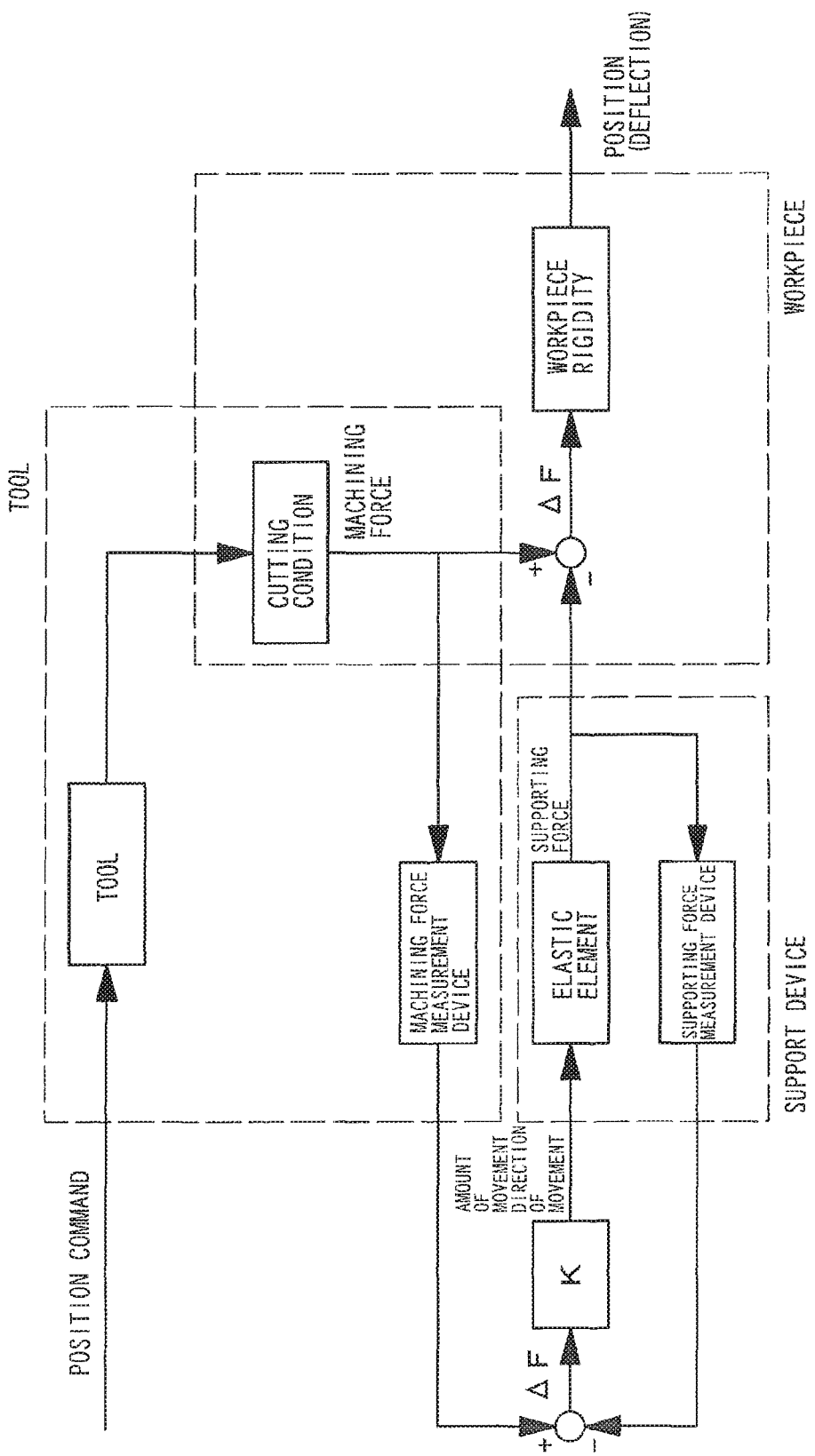
F I G. 6

MACHINE TOOL

CROSS REFERENCE TO RELATED APPLICATION

The present invention claims priority under 35 U.S.C. § 119 to Japanese Patent Application No. 2016-160110 filed on Aug. 17, 2016, the entire content of which is incorporated herein by reference.

TECHNICAL FIELD

The present disclosure relates to a machine tool that removal-machines a workpiece by means of a tool.

BACKGROUND

Machine tools that removal-machine a part of a workpiece by a tool are widely known in the related art. In such machine tools, when the workpiece is machined, the tool is pressed against the workpiece while a part of the workpiece is retained by a retaining device such as a workpiece spindle device.

In this process, there may be cases where a part of the workpiece is deflected due to a force of the tool pushing the workpiece. When the workpiece is deflected, machining precision is inevitably reduced. Thus, in order to prevent the deflection of the workpiece, in the related art, there has been proposed provision of a support device which supports the workpiece, separately from the workpiece spindle device.

For example, JP 2010-264562 A discloses a machining system in which ends of the workpiece are supported by an end supporting means, and an intermediate part of the workpiece is supported by an intermediate part supporting means. In this machining system, a position of the workpiece is measured with a sensor, and a workpiece support position in the up-and-down direction by the intermediate part supporting means is adjusted based on the measurement result, so that height positions of the ends and the intermediate part of the workpiece are the same. According to such a technique, deflection can be prevented for various workpieces having different shapes, and the machining precision can be further improved.

In the support device of the related art, however, the support point (workpiece support position) is controlled by position control. That is, a position of a support point is measured by a sensor or the like, and the support point is moved and controlled so that the measurement result matches a target value. However, in order to appropriately support the workpiece by such position control, a high level of positioning precision is required. In order to highly precisely position the support point, it is necessary that the support device to be controlled itself has a high rigidity. This is because, when the support device has a low rigidity and the support device is deflected, a control error would be increased. However, when the rigidity of the support device is to be increased, problems may arise such as an increase in size and cost of the support device.

An advantage of the present disclosure lies in provision of a machine tool which can appropriately support a workpiece even when the support device has a low rigidity.

SUMMARY

According to one aspect of the present disclosure, there is provided a machine tool which removal-machines a workpiece by means of a tool, comprising: a retaining device that retains the workpiece; a support device that supports the workpiece, in order to suppress deflection of the workpiece retained by the retaining device; and a control device that controls driving of the support device by force control having a force as a control target.

According to another aspect of the present disclosure, the machine tool may further comprise: a supporting force measurement unit that measures a supporting force of the workpiece by the support device; and a machining force measurement unit that measures a machining force of the workpiece by the tool, wherein the control device may force-control the support device based on a comparison result of the measured supporting force and the measured machining force.

According to another aspect of the present disclosure, the machine tool may further comprise a retaining force measurement unit that measures a retaining force of the workpiece by the retaining device, wherein the control device may force-control the support device based on a comparison result of an initial retaining force measured before machining by the tool and before supporting by the support device, and a comparison retaining force measured during the machining by the tool and during the supporting by the support device.

According to another aspect of the present disclosure, the machine tool may further comprise at least one of a supporting force measurement unit that measures a supporting force of the workpiece by the support device and a machining force measurement unit that measures a machining force of the workpiece by the tool, wherein the control device may force-control the support device based on a comparison result of the measured supporting force or the measured machining force with a theoretical value of the supporting force or the machining force determined based on a machining condition.

According to another aspect of the present disclosure, the support device may support the workpiece with an elastic element therebetween. In this case, the machine tool may further comprise a rigidity changing mechanism that changes rigidity of the elastic element.

According to another aspect of the present disclosure, the support device may comprise a multi-degrees-of-freedom robot, and an end effector attached to the multi-degrees-of-freedom robot, and the end effector may contact the workpiece and support the workpiece. In this case, a plurality of types of the end effectors may be prepared, and an end effector attached to the multi-degrees-of-freedom robot may be exchangeable.

According to a machine tool of various aspects of the present disclosure, because driving of the support device is controlled by force control having a force as a target of control, even when the rigidity of the support device, and consequently, the positioning precision of the support device, is low, the workpiece can be appropriately supported. As a result, even when the support device has a low rigidity, the workpiece can be appropriately supported.

BRIEF DESCRIPTION OF DRAWINGS

Embodiments of the present disclosure will be described by reference to the following figures, wherein

FIG. 6 is a control block diagram showing contents of control by a control device;

DESCRIPTION OF EMBODIMENTS

Figure 1:
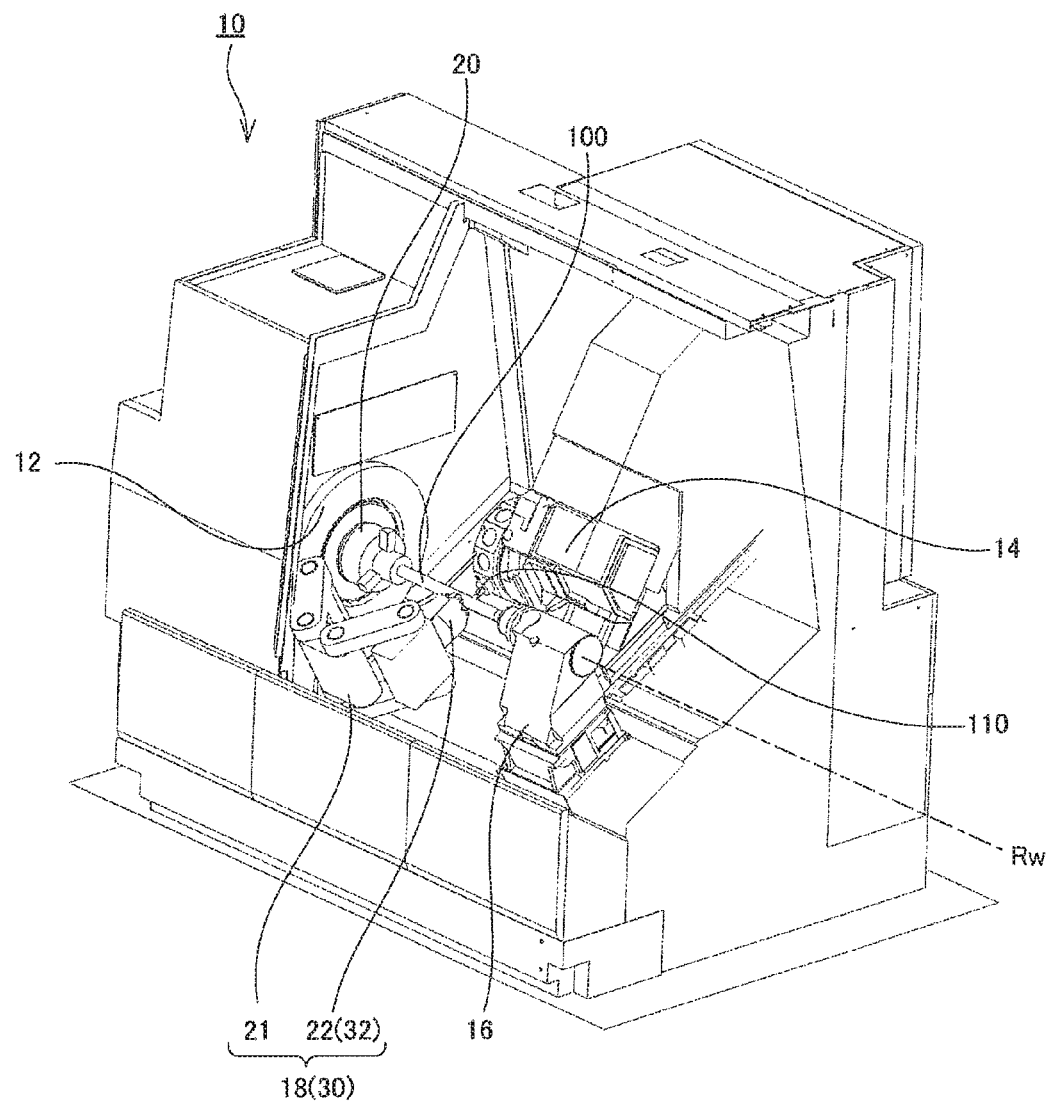
FIG. 1 is a perspective view of a machine tool.

A structure of a machine tool 10 will now be described with reference to the drawings. FIG. 1 is a perspective view of the machine tool 10. In the following description, a rotation axis direction of a workpiece spindle 12 will be referred to as a Z-axis, a movement direction of a tool post 14 orthogonal to the Z-axis will be referred to as an X-axis, and a direction orthogonal to the X-axis and the Z-axis will be referred to as a Y-axis direction. In addition, on the Z-axis, a direction from the workpiece spindle 12 toward a tailstock 16 will be referred to as a positive direction; on the X-axis, a direction from the workpiece spindle 12 toward the tool post 14 will be referred to as a positive direction; and on the Y-axis, an upward direction from the workpiece spindle 12 will be referred to as a positive direction.

The machine tool 10 is a lathe which removal-machines (lathe-turns) a workpiece 100 by causing a tool 110 retained on the tool post 14 to contact the workpiece 100 which is self-rotating. The machine tool 10 disclosed herein is a lathe called a turning center, which is NC-controlled and which retains a plurality of tools 110. A periphery of the machine tool 10 is covered with a cover (not shown). A space partitioned by the cover is a machining chamber in which machining of the workpiece 100 is executed. On the cover, there are provided at least one opening, and a door which opens and closes the opening (both of which are not shown). An operator accesses an inside of the machine tool 10 and the workpiece 100 or the like through the opening. During the machining, the door provided on the opening is closed. This is for the sake of safety and the surrounding environment.

The machine tool 10 comprises the workpiece spindle 12 which retains one end of the workpiece 100 in a manner to allow self-rotation, the tool post 14 which retains the tool 110, the tailstock 16 which supports the other end of the workpiece 100, and an in-machine robot 18. On the workpiece spindle 12, a chuck 20 and/or a collet which detachably retains the workpiece 100 is attached, and the workpiece 100 to be retained can be suitably exchanged. In addition, the workpiece spindle 12 and the chuck 20 self-rotate around a workpiece rotation axis Rw extending in the horizontal direction (Z-axis direction in FIG. 1) as a center.

The tailstock 16 is placed opposing the workpiece spindle 12 in the Z-axis direction, and supports the other end of the workpiece 100 retained by the workpiece spindle 12. The tailstock 16 is placed at a location such that a center axis thereof coincides with the workpiece rotation axis Rw. On the tailstock 16, a center having a tip sharpened in a conical shape is attached, and, during the machining, a tip of the center is contacted to a center point of the workpiece 100. The tailstock 16 is movable in the Z-axis direction so that the tailstock 16 can move close to or away from the workpiece 100. The tailstock 16 and the workpiece spindle 12 function as a retaining device that retains the workpiece 100.

The tool post 14 retains the tool 110, such as a tool 110 which is called a bite. The tool post 14 is movable in the Z-axis direction. In addition, the tool post 14 is placed on a guiderail extending in the X-axis direction, so that the tool post 14 can move back and forth also in the X-axis direction. At a tip of the tool post 14, there is provided a turret which can retain a plurality of tools 110. The turret is rotatable around an axis extending in the Z-axis direction as a center. By the rotation of the turret, the tool 110 used for the machining of the workpiece 100 can be suitably changed. When the tool post 14 is moved in the Z-axis direction, the tool 110 retained on the turret also moves in the Z-axis direction. When the tool post 14 is moved in the X-axis direction, the tool 110 retained on the turret also moves in the X-axis direction. With the movement of the tool post 14 in the X-axis direction, an amount of cutting of the workpiece 100 by the tool 110, and consequently, a pressing force or the like of the workpiece 100 by the tool 110, is changed. In the following description, a force of the tool 110 pressing the workpiece 100 for the cut-machining will be referred to as a "machining force."

The in-machine robot 18 comprises an articulated robot 21, and an end effector 22 attached to the articulated robot 21. The articulated robot 21 is a multi-degrees-of-freedom robot having a plurality of arms and a plurality of joints, and driving of the articulated robot 21 is controlled by a control device (not shown) to be described later. In the present configuration, the articulated robot 21 is provided near the workpiece spindle 12, but alternatively, the placement position and the structure of the articulated robot 21 may be suitably changed, so long as the desired functions can be achieved. In addition, so long as a position and an orientation of the end effector 22 can be suitably changed, other robots such as, for example, a parallel link robot and a one-axis turning arm may be used in place of the articulate robot 21.

The end effector 22 is a part which acts on a target in some way. In the present configuration, a plurality of types of the end effectors 22 are prepared, and an end effector 22 which is suited is alternatively selected as necessary, and is attached on the articulated robot 21. Examples of the end effectors 22 which are prepared include, in addition to a support construction which supports the workpiece 100, sensors which detect various physical amounts, a hand mechanism that pinches a member, or the like. When the support construction is selected as the end effector 22 and is attached on the articulated robot 21, the in-machine robot 18 functions as a support device 30 which supports the workpiece 100. In the following description, a force with which the support device 30 supports (presses) the workpiece 100 will be referred to as a "supporting force."

No particular limitation is imposed on a structure of the support construction, so long as the workpiece 100 can be supported. However, in order to reduce a sensitivity of the supporting force with respect to a change of a position, desirably, the support construction has a structure to contact the workpiece 100 with an elastic element therebetween. In addition, the workpiece 100 self-rotates at a high speed during the machining. Therefore, desirably, the support construction 32 has a structure which can support the workpiece 100 without obstructing the self-rotation of the workpiece 100; for example, a structure having a roller which contacts a surface of the workpiece 100.

Figure 2A:
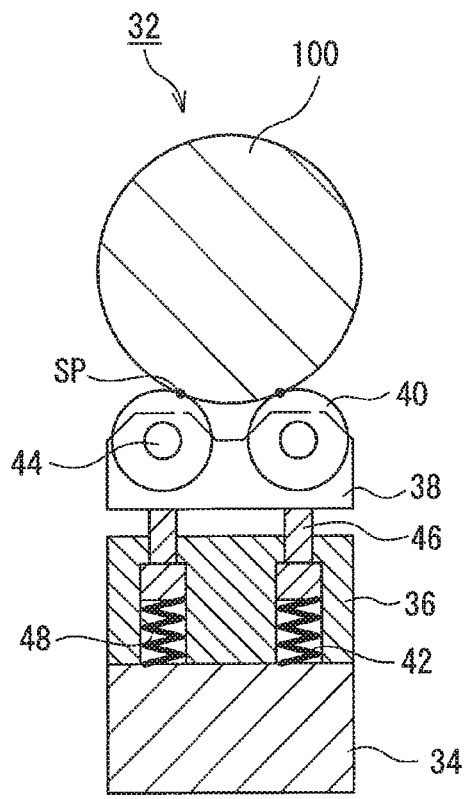
FIG. 2A and FIG. 2B are diagrams showing a structure of a support construction.
Figure 2B:
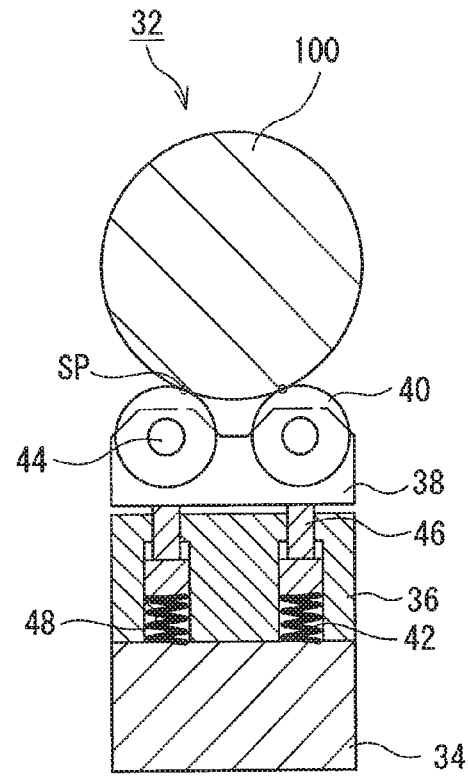

FIG. 2A and FIG. 2B are diagrams showing an example configuration of the support construction 32. The support construction 32 comprises a base unit 34 attached to a tip of the in-machine robot 18, a cylinder block 36, a pair of rollers 40, a cover structure 38, or the like. The base unit 34 is a member having an approximate block form. On an upper surface of the base unit 34, the cylinder block 36 is fixed. The cylinder block 36 is a block-form member in which a cylinder 48 which extends in a predetermined forward-backward direction (up and down direction on the paper) is formed therein. In the example configuration of FIG. 2A and FIG. 2B, two cylinders 48 which extend parallel to each other are provided. In an inside of each cylinder 48, a coil spring 42 which functions as an elastic element is stored.

The pair of rollers 40 are members which directly contact the workpiece 100 to support the workpiece 100. A point of contact between the pair of rollers 40 and the workpiece 100 is a support point SP of the workpiece 100. Two rollers 40 are placed in a direction orthogonal to the forward-backward direction. Each roller 40 can self-rotate around a rotation shaft 44 attached on the center thereof. The rotation shaft 44 is attached to the cover structure 38.

The cover structure 38 is a member which stores the pair of rollers 40, and two pistons 46 extend from a lower surface of the cover structure 38. A tip of each of the pistons 46 is inserted into the cylinder 48, and each piston 46 can move forward and backward in the cylinder 48. By the piston 46 moving forward and backward, the coil spring 42 is extended and compressed. In other words, the supporting force for supporting the workpiece 100 is generated by the tip of the in-machine robot 18 (the end effector 22) moving closer to the workpiece 100, and the supporting force is transferred to the workpiece 100 through the elastic element (coil spring 42). By providing the elastic element partway on the force transfer, it becomes possible to reduce the sensitivity of the supporting force with respect to a change of the position of the tip of the in-machine robot 18, and to consequently prevent a rapid change of the supporting force.

Figure 3A:
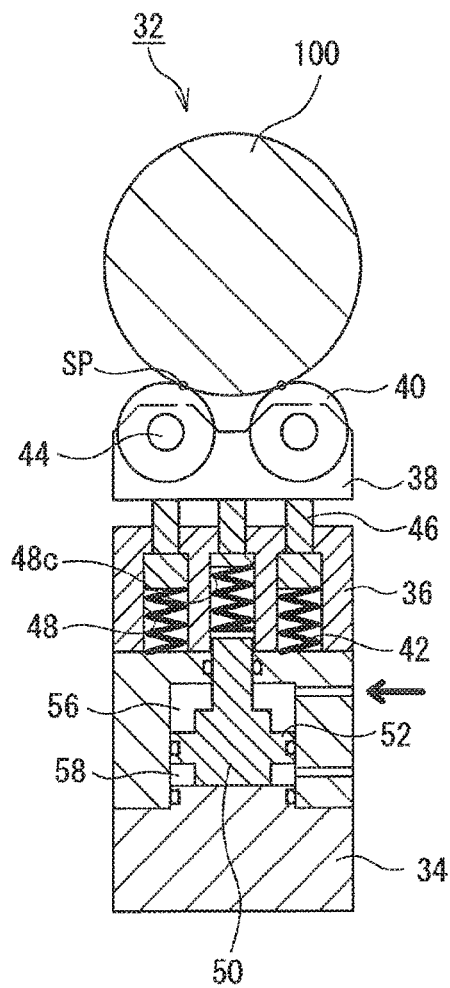
FIG. 3A and FIG. 3B are diagrams showing a structure of another support construction.
Figure 3B:
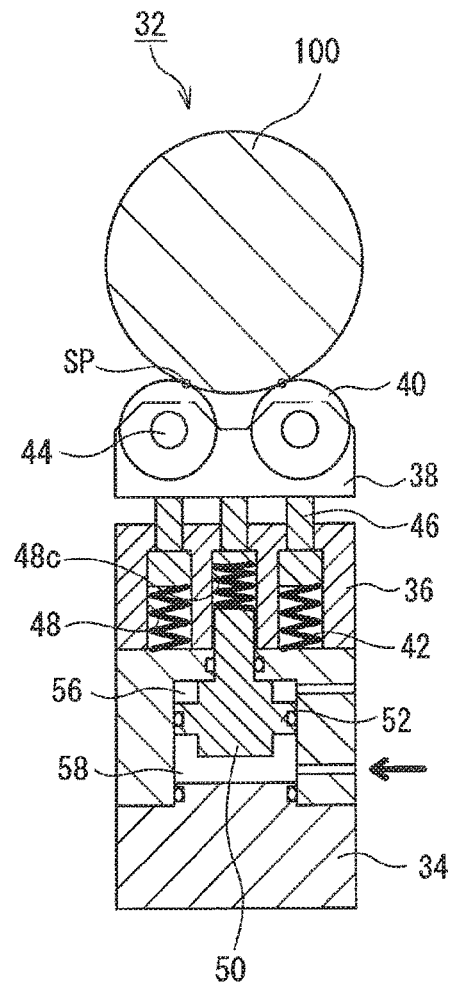

The structure of the support construction 32 described herein is merely exemplary, and may be suitably modified. For example, the support construction 32 may include a rigidity changing mechanism which can change rigidity (spring constant) of the elastic element. As the rigidity changing mechanism, various structures may be considered, and, for example, a mechanism may be employed in which a number of elastic elements interposed between the roller 40 and the in-machine robot 18 can be suitably switched. FIG. 3A and FIG. 3B are diagrams showing an example configuration of the support construction 32 in which the number of elastic elements which actually function can be switched. In the example configuration of FIG. 3A and FIG. 3B, three coil springs 42 are provided between the roller 40 (support point SP) and the base unit 34, and each coil spring 42 is stored in the cylinder 48 formed on the cylinder block 36. Of the three cylinders 48, a cylinder 48c at the center has its length variable. By setting the length of the center cylinder 48c to be longer than a length of the coil spring 42 at a no-load state (hereinafter referred to as "initial length"), the center coil spring 42 is set non-operative, and by setting the length to be less than or equal to the initial length, the center coil spring 42 is set operative. In other words, by changing the length of the center cylinder 48c, the number of operative elastic elements is changed, and the rigidity of the elastic element(s) acting on the support construction 32 as a whole is changed.

The length of the cylinder 48 can be changed, for example, by placing a movable element 50 at one end of the cylinder 48 as shown in FIG. 3A and FIG. 3B, and moving the movable element 50 forward and backward. For the forward and backward movement of the movable element 50, various forces may be used, including oil pressure, air pressure, electromagnetic force, magnetic force, or the like. FIG. 3A and FIG. 3B shows a structure which moves the movable element 50 forward and backward using the air pressure. More specifically, an intermediate block 54 having an air chamber formed therein is provided between the cylinder block 36 and the base unit 34, and a part of the movable element 50 is stored in the air chamber. On partway on the movable element 50, a flange 52 which protrudes outside in a radial direction is formed. The air chamber is divided by the flange 52 into two chambers, an upper air chamber 56 positioned on an upper side of the flange 52, and a lower air chamber 58 positioned at a lower side of the flange 52. In this configuration, by supplying compressed air to the upper or lower air chamber 56 or 58, the movable element 50 is moved forward and backward. That is, when the compressed air is supplied to the upper air chamber 56, the movable element 50 moves downward by the air pressure, the length of the cylinder 48 is elongated, and the coil spring 42 is thus set non-operative. On the other hand, when the compressed air is supplied to the lower air chamber 58, the movable element 50 moves upward, the length of the cylinder 48 is shortened, and the coil spring 42 is thus set operative.

The machine tool 10 further comprises a load sensor which measures the machining force and the supporting force. As described above, the machining force is a force of the tool 110 pressing the workpiece 100 for the cut machining. In order to measure the machining force, a load sensor 60 which functions as a machining force measurement device (refer to FIG. 4) is provided at a root of the tool 110 of the tool post 14. The supporting force is a force of the support construction 32 (the end effector 22) pressing the workpiece 100. In order to measure the supporting force, a load sensor 62 which functions as a supporting force measurement device (refer to FIG. 4) is provided between the piston 46 and the coil spring 42 of the support construction 32. The load sensor may be a device which users a piezoelectric element which converts a force into a voltage or a device which converts an amount of displacement into force information such as a strain gauge. Alternatively, the supporting force and the machining force may be measured by other structures, so long as the machining force and the supporting force can be directly or indirectly measured. For example, the position of the load sensor may be changed as suited. Alternatively, it is possible to not provide the load sensor, and to calculate the supporting force from an output torque of a drive motor provided at each joint of the in-machine robot 18, and the machining force from a cutting motive force generated at the workpiece spindle 12. In either way, the measured supporting force and the measured machining force are output to the control device.

The control device is a device which is generally called a numerical control device, and controls driving of various parts of the machine tool 10 according to an instruction from an operator. The control device comprises, for example, a CPU which executes various calculations, and a storage unit which stores various control programs and control parameters. The control device also has a communication function, and can exchange various data such as, for example, NC program data, with other devices. The control device may be a single device or may be formed by combining a plurality of calculation devices.

Figure 4:
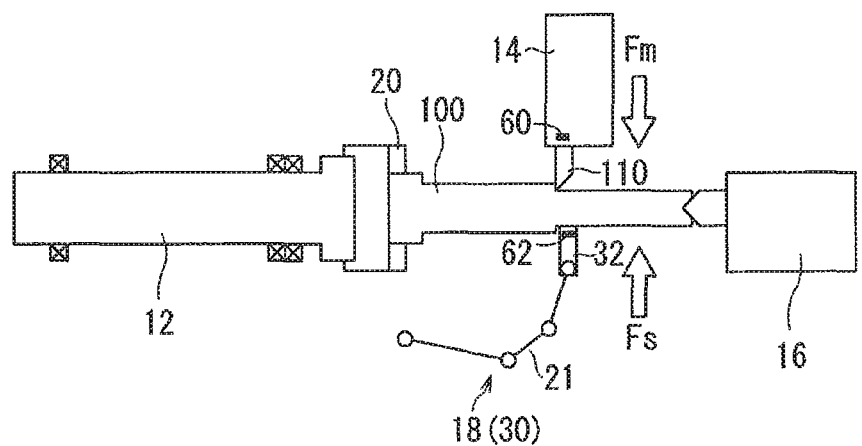
FIG. 4 is an image diagram showing support by an in-machine robot.
Figure 5:
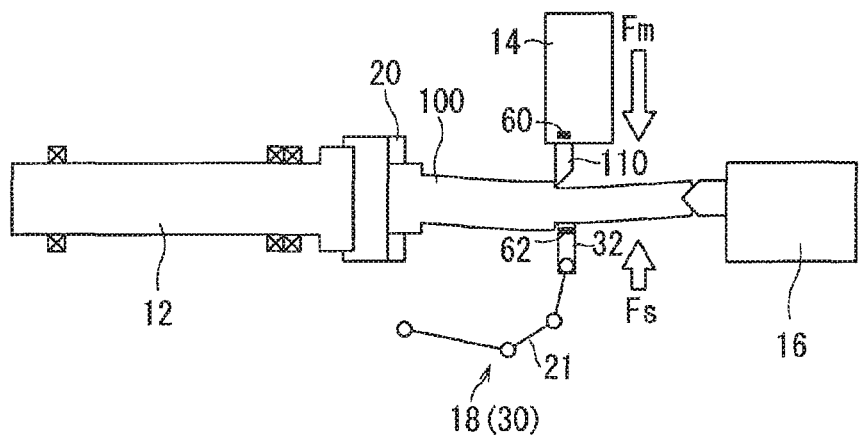
FIG. 5 is an image diagram showing support by an in-machine robot.

The control device force-controls driving of the in-machine robot 18 (support device 30) which supports the workpiece 100 in order to prevent deflection of the workpiece 100 retained by the workpiece spindle 12 and the tailstock 16 (retaining device). Here, "force-control" means that the driving is controlled with the force as a control target value. The control of the driving of the in-machine robot 18 (support device 30) will now be described with reference to FIGS. 4-6. FIGS. 4 and 5 are image diagrams showing support by the in-machine robot 18, FIG. 4 showing a case where the supporting force Fs is appropriate, and FIG. 5 showing a case where the supporting force Fs is too small. FIG. 6 is a control block diagram showing positioning control of the tool 110 and the support device 30 by the control device.

As already described, the workpiece 100 retained on the workpiece spindle 12 and the tailstock 16 self-rotates with the workpiece rotation axis Rw as a center. By pressing the tool 110 against the self-rotating workpiece 100, the workpiece 100 is lathe-turn-machined. With the pressing of the tool 110, a machining force Fm is applied to the workpiece 100. When the workpiece 100 is deflected by receiving the machining force Fm, the machining precision may be reduced.

Thus, in the machine tool of the present disclosure, the support construction 32 is placed at a side opposite from the tool 110 with the workpiece 100 therebetween, and the workpiece 100 is supported by the support construction 32. With the support by the support construction 32, a supporting forcer Fs which is a force directed opposite from the machining force Fm is applied to the workpiece 100.

When the machining force Fm and the supporting force Fs are equal and balanced, the workpiece 100 is set in a state without any deflection, as shown in FIG. 4. On the other hand, when one of the machining force Fm and the supporting force Fs is larger than the other, for example, when the machining force Fm is larger than the supporting force Fs, the workpiece 100 is deflected by receiving a larger force, as shown in FIG. 5. In this case, the machining precision is reduced.

Thus, in the machine tool of the present disclosure, the machining force Fm and the supporting force Fs are measured, and the driving of the tool 110 spindle and the support device 30 are controlled so that the machining force Fm and the supporting force Fs are equal to each other. Specifically, as shown in FIG. 6, the control device calculates a position command of the tool post 14 according to a machining program, and outputs the position command. By the tool post 14 being moved according to the position command, the tool 110 is positioned at a position designated by the machining program. When the tool 110 is positioned, the machining force Fm is generated corresponding to the machining condition, such as, for example, an amount of cutting, a blade shape, or the like. The machining force measurement device (load sensor 60) provided on the tool 110 spindle detects the machining force Fm.

A differential force ΔF which is a difference between the machining force Fm and the supporting force Fs by the support device 30 acts on the workpiece 100. Based on a relationship between the differential force ΔF and the rigidity of the workpiece 100, the position of the workpiece 100, and, consequently, presence or absence of deflection, is determined.

The supporting force measurement device detects the supporting force Fs by the support device 30. The control device calculates a difference ΔF between the supporting force Fs and the machining force Fm. The control device multiplies the obtained difference ΔF by a proportionality gain K, calculates an amount of movement and a direction of movement of the support construction 32, and instructs the articulated robot 21 to move by the calculated amount of movement. The movement direction is a direction to move the support construction 32 closer to the workpiece 100 when ΔF is a positive value; that is, when the supporting force Fs is smaller than the machining force Fm. On the other hand, the movement direction is a direction to move the support construction 32 away from the workpiece 100 when ΔF is a negative value; that is, when the supporting force Fs is larger than the machining force Fm. When ΔF is substantially 0; that is, when the machining force Fm and the supporting force Fs are approximately equal to each other, the amount of movement is also set to 0.

By the articulated robot 21 receiving the movement instruction and moving, the force of movement of the articulated robot 21 is output through the elastic element as the supporting force Fs. Subsequently, the supporting force Fs is continued to be fed back, so as to control movement of the articulated robot 21 to set the difference ΔF with the machining force Fm to zero.

As described, in the machine tool of the present disclosure, the driving of the in-machine robot 18 (support device 30) is controlled by the force control to equate the supporting force Fs and the machining force Fm. As a result, the deflection of the workpiece 100 can be prevented, and the machining precision of the workpiece 100 by the tool 110 can be further improved.

In order to prevent deflection of the workpiece 100, as an alternative to the force control, there also exists a method of controlling the driving of the support device 30 by position control. For example, JP 2010-264562 A discloses control of driving of the support device by the position control. Specifically, an amount of deflection of the workpiece is detected by a non-contact sensor, a target position of the support device is calculated based on the amount of deflection, and the position control is applied so that the position of the support device is set at a target position. However, in order to appropriately support the workpiece by the position control as in the related art, a high level of positioning precision has been required. When the support device 30 is a robot, however, it is difficult to maintain a high rigidity, and consequently, to achieve a higher level of positioning precision. While it is possible to increase the rigidity by thickening the arms of the articulated robot 21, such a configuration would result in a new problem such as increases in cost and size.

On the other hand, when the driving of the support device 30 (in-machine robot 18) is controlled by the force control having the force as a target value, even when the positioning precision and the rigidity of the support device are low, an appropriate force can be achieved. As a result, even when the support device 30 has a poor rigidity, the workpiece 100 can be appropriately supported. In addition, because a high rigidity is not demanded for the support device 30, a robot which tends to have a low rigidity can be used as the support device 30. With the use of the robot of which the position and orientation can be freely changed, the position of the support point SP and the direction of support can be freely changed, and the workpiece 100 can thus be supported in a larger number of scenes and occasions. Further, in the case of the robot, the function thereof can be changed by merely changing the end effector 22 to be attached, thus resulting in a further improvement in convenience of the machine tool 10.

As repeatedly described above, in the machine tool of the present disclosure, the workpiece 100 is supported through the elastic element. In this case, because a part of the pressing force generated by the movement of the articulated robot 21 is absorbed by the elastic element, a rapid change of the supporting force Fs by the movement of the articulated robot 21 can be prevented. As a result, the workpiece 100 can be more stably supported. In addition, when a support construction 32 in which the rigidity of the elastic element can be changed as shown in FIG. 3A and FIG. 3B are used as the support construction 32, even when the supporting force Fs is changed due to a change of cutting conditions or the like, an appropriate rigidity can be selected. Thus, the workpiece 100 can be more stably supported.

Figure 7:
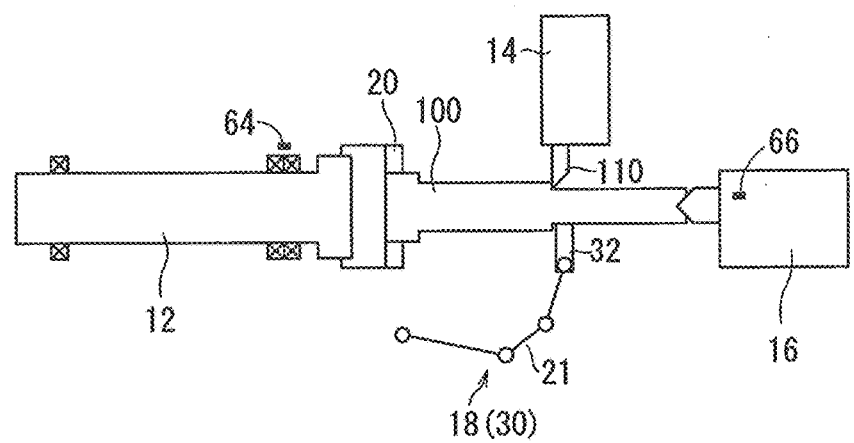
FIG. 7 is an image diagram showing support by an in-machine robot.

Next, another example configuration of the machine tool 10 will be described. In this alternative configuration, the driving of the support device 30 (in-machine robot 18) is controlled based on a change of a force acting on the retaining device which retains the workpiece 100 (hereinafter referred to as "retaining force Fr"), in place of the machining force Fm and the supporting force Fs. More specifically, when the supporting force Fs and the machining force Fm are balanced, in the overall view, the locations of support and machining are in a same state as that in the case where no force is applied. Therefore, when the supporting force Fs and the machining force Fm are balanced, the retaining force Fr can be considered to be equal to a force applied in an initial state where the cutting by the tool 110 and the supporting by the support device 30 are not executed. Thus, in the present configuration, as shown in FIG. 7, load sensors 64 and 66 are provided near a bearing which pivotally supports the workpiece spindle 12 or the tailstock 16 or the like, to detect the retaining force Fr. The control device stores forces detected by the load sensors 64 and 66 at an initial timing before the machining by the tool 110 is started and before the supporting by the support device 30 is started, as an initial retaining force Fr_def. When the machining and supporting are started, the control device compares the retaining force Fr detected by the load sensors 64 and 66 and the initial retaining force Fr_def, and controls the driving of the support device 30 so that the retaining force Fr becomes close to the initial retaining force Fr_def.

As is clear from the above description, in the above-described structure also, the driving of the support device 30 (in-machine robot 18) is controlled by the force control to set the retaining force Fr close to the initial retaining force Fr_def. Because of this, even when the support device 30 has a poor rigidity, the workpiece 100 can be appropriately supported. In the description above, the retaining force Fr is measured by the load sensors 64 and 66, but the retaining force Fr may alternatively be measured by other methods. For example, the retaining force Fr may be measured based on a driving motive force of the workpiece spindle 12 or the like.

Next, another example configuration will be described. In the above description, the driving of the support device 30 is controlled based on the comparison result of the measured values of the supporting force Fs and the machining force Fm. In the present configuration, the driving of the support device 30 is controlled based on a comparison of a measured value of the supporting force Fs or a measured value of the machining force Fm with a theoretical value of the machining force Fm. That is, in principle, the measured values of the machining force Fm and the supporting force Fs should match the theoretical values thereof. However, when the supporting force Fs is smaller than the machining force Fm, the workpiece 100 escapes (deflects) toward the side of the support device 30. Thus, the cut resistance is reduced, and the machining force Fm becomes smaller than the theoretical value. On the other hand, when the supporting force Fs is larger than the machining force Fm, the workpiece 100 escapes (deflects) toward the side of the tool 110, and thus, the cut resistance is increased and the machining force Fm becomes larger than the theoretical value.

In the present configuration, this principle is used to control the driving of the support device 30. Specifically, the control device estimates the cut resistance, and consequently, the machining force Fm, based on cutting conditions such as an amount of cutting, an amount of feed, and a number of rotations, and physical properties such as materials and shapes of the workpiece 100 and the tool 110, and outputs the estimated value as a theoretical value. The control device measures at least one of the supporting force Fs and the machining force Fm, and controls the driving of the support device 30 so that the measured value is set closer to the theoretical value.

As is clear from the description above, in the present configuration also, the driving of the support device 30 (in-machine robot 18) is controlled by the force control to set the measured value(s) of the supporting force Fs and/or the machining force Fm close to the theoretical value. Because of this, even when the support device 30 has a poor rigidity, the workpiece 100 can be appropriately supported.

Figure 8:
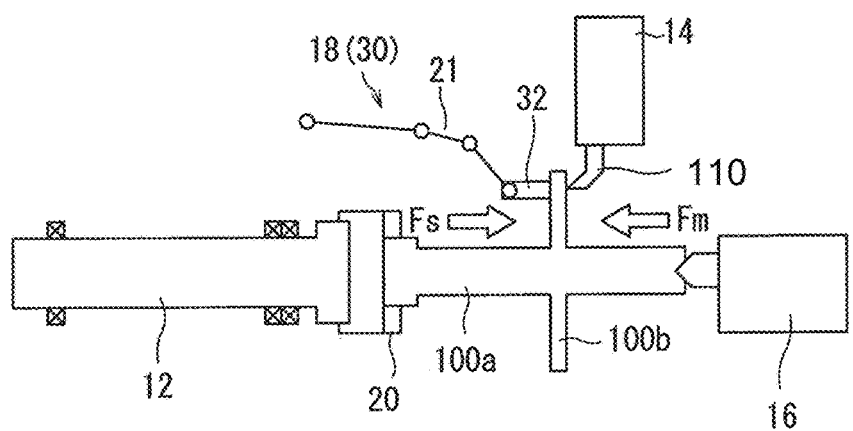
FIG. 8 is an image diagram showing support by an in-machine robot.

The structures described above are merely exemplary, and other structures may be modified so long as the driving of the support device 30 is controlled by the force control. For example, in the above description, configurations are described in which both the machining force Fm and the supporting force Fs are forces in the radial direction, but alternatively, the directions of the machining force Fm and the supporting force Fs may be suitably changed according to the shape of the workpiece 100 to be machined. For example, as shown in FIG. 8, when the workpiece 100 has a circular pillar shape body 100a and a flange section 100b protruding outward in the radial direction partway on the body 100a, and an end surface of the flange section 100b in the axial direction is to be machined, a machining force Fm in an axial direction is applied to the workpiece 100. In this case, the support device 30 may support the position at an opposite side of the tool 110 with the flange section 100b therebetween, and, in this case, a supporting force Fs in the axial direction is applied to the workpiece 100. In such a configuration also, by controlling the driving of the support device 30 with force control, the workpiece 100 can be appropriately retained.

Figure 9:
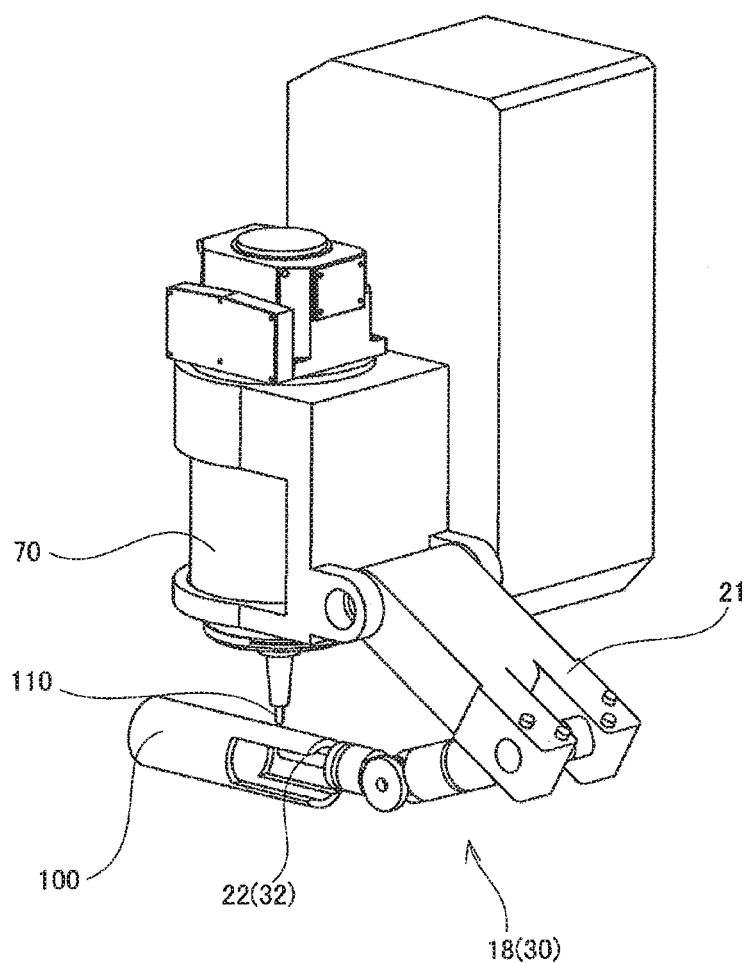
FIG. 9 is a perspective view showing support by an in-machine robot.

Moreover, in the above description, only a case of the lathe is described, but the technique of the present disclosure may be applied to machine tools 10 other than the lathe, such as, for example, a milling machine which rotationally cuts the workpiece 100 with a rotating tool 110, and a machining center. FIG. 9 is a perspective view of a machining center to which the technique of the present disclosure is applied, near a tool spindle 70. As is well-known in the art, the machining center has the tool spindle 70 which rotationally retains the tool 110. In the example configuration of FIG. 9, the in-machine robot 18 which functions as the support device 30 is attached to the tool spindle 70. At the tip of the in-machine robot 18, an end effector 22 which is the support construction 32 is provided.

In this case also, when the workpiece 100 is to be machined by the tool 110, the support construction 32 (the end effector 22) may be placed at the opposite side of the tool 110 with the workpiece 100 therebetween, to support the workpiece 100. The driving of the in-machine robot 18 (the support device 30) having the support construction 32 may then be controlled by force control.

Furthermore, in the above description, the support device 30 is formed with the robot, but other structures may be employed, so long as the support device 30 can support the workpiece 100 and can suitably change the position of the support point SP. For example, the support device 30 may be a lifting/lowering mechanism which is placed below the workpiece 100, and which only lifts or lowers according to the instruction from the control device.

The invention claimed is:

1. A machine tool which removal-machines a workpiece, comprising:
   a tool;
   a retaining device that retains the workpiece;
   a support device that supports the workpiece, in order to suppress deflection of the workpiece retained by the retaining device;
   a control device that controls driving of the support device by force control having a force as a control target;
   a supporting force measurement unit that measures a supporting force of the workpiece by the support device; and
   a machining force measurement unit that measures a machining force of the workpiece by the tool, wherein
   the control device force-controls the support device based on a comparison result of the measured supporting force and the measured machining force.

2. A machine tool which removal-machines a workpiece, comprising:
   a tool;
   a retaining device that retains the workpiece;
   a support device that supports the workpiece, in order to suppress deflection of the workpiece retained by the retaining device;
   a control device that controls driving of the support device by force control having a force as a control target, and
   a retaining force measurement unit that measures a retaining force of the workpiece by the retaining device, wherein
   the control device force-controls the support device based on a comparison result of an initial retaining force measured before machining by the tool and before supporting by the support device, and a comparison retaining force measured during the machining by the tool and during the supporting by the support device.

3. A machine tool which removal-machines a workpiece, comprising:
   a retaining device that retains the workpiece;
   a support device that supports the workpiece, in order to suppress deflection of the workpiece retained by the retaining device; and
   a control device that controls driving of the support device by force control having a force as a control target, wherein
   the control device force-controls the support device based on a comparison result of the measured supporting force or the measured machining force with a theoretical value of the supporting force or the machining force determined based on a machining condition.

4. The machine tool according to claim 1, wherein
   the support device supports the workpiece with an elastic element therebetween.

5. The machine tool according to claim 4, further comprising:
   a rigidity changing mechanism that changes rigidity of the elastic element.

6. A machine tool which removal-machines a workpiece, comprising:
   a retaining device that retains the workpiece;
   a support device that supports the workpiece, in order to suppress deflection of the workpiece retained by the retaining device; and
   a control device that controls driving of the support device by force control having a force as a control target, wherein
   the support device comprises:
   a multi-degrees-of-freedom robot; and
   an end effector attached to the multi-degrees-of-freedom robot, and
   the end effector contacts the workpiece and supports the workpiece.

7. The machine tool according to claim 6, wherein
   a plurality of types of the end effectors are prepared, and
   an end effector attached to the multi-degrees-of-freedom robot is exchangeable.

8. The machine tool according to claim 2, wherein
   the support device supports the workpiece with an elastic element therebetween.

9. The machine tool according to claim 8, further comprising:
   a rigidity changing mechanism that changes rigidity of the elastic element.

10. The machine tool according to claim 3, wherein
    the support device supports the workpiece with an elastic element therebetween.

11. The machine tool according to claim 10, further comprising:
    a rigidity changing mechanism that changes rigidity of the elastic element.

12. The machine tool according to claim 6, wherein
    the support device supports the workpiece with an elastic element therebetween.

13. The machine tool according to claim 12, further comprising:
    a rigidity changing mechanism that changes rigidity of the elastic element.

* * * * *